United States Patent
Li

(10) Patent No.: US 8,170,421 B2
(45) Date of Patent: May 1, 2012

(54) METHOD AND APPARATUS FOR CLOCK RECOVERY

(75) Inventor: Jianchang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 721 days.

(21) Appl. No.: 12/328,957

(22) Filed: Dec. 5, 2008

(65) Prior Publication Data

US 2009/0086767 A1 Apr. 2, 2009

Related U.S. Application Data

(63) Continuation of application No. PCT/CN2007/070084, filed on Jun. 5, 2007.

(30) Foreign Application Priority Data

Jun. 7, 2006 (CN) .......................... 2006 1 0083573

(51) Int. Cl.
*H04B 10/00* (2006.01)

(52) U.S. Cl. .......... 398/154; 398/155; 398/79; 398/175; 370/542; 370/537; 370/538; 375/354; 375/371

(58) Field of Classification Search .................. 398/154, 398/155, 158, 79, 159, 135, 136, 137, 139, 398/202, 208, 211, 212, 213, 214, 175, 176, 398/177, 17, 98, 66, 68, 72, 99, 100; 370/503, 370/516, 518, 356, 466, 474, 542, 537, 538, 370/535, 476; 375/354, 371, 376, 372, 373, 375/374, 375

See application file for complete search history.

(56) References Cited

U.S. PATENT DOCUMENTS

| 5,367,545 A | 11/1994 | Yamashita et al. |
| 6,314,115 B1 | 11/2001 | Delfyett et al. |
| 6,411,415 B1 | 6/2002 | Smets et al. |

(Continued)

FOREIGN PATENT DOCUMENTS

CN 1147734 A 4/1997

(Continued)

OTHER PUBLICATIONS

Cochennec et al., "Asynchronous Time-Division Networks: Terminal Synchronization for Video and Sound Signals," *Proceedings of Global Telecommunications Conference and Exhibition (IEEE)*, 2: 791-794 (Dec. 1985).

(Continued)

*Primary Examiner* — Hanh Phan

(74) *Attorney, Agent, or Firm* — Leydig,Voit & Mayer, Ltd.

(57) ABSTRACT

A clock recovery method and apparatus is provided. The high-order demultiplexing-demapping unit (102) demultiplexes and demaps the high-order OTN frame (101) into N low-order ODTUjk frames (103), and transmits the N low-order ODTUjk frames (103) to the low-order demapping unit (104); the low-order demapping unit (104) respectively demaps the N ODTUjk frames (103) into N ODUj frames (105), and writes the ODUj frames from memory unit 1 (106) to memory unit n (108) into memory unit n+1 (109) to memory unit 2n (111) by using the clock signal whose gaps are uniformly distributed; and the ODUj frame clock generating unit (113) adjusts the read out clock in memory unit n+1 (109) to memory unit 2n (111), i.e. ODUj frame clock (114), according to the data volume stored in memory unit n+1 (109) to memory unit 2n (111). The embodiments of the invention effectively filter a great deal of jitter generated during the mapping and demapping process, and can recovery high quality clock signal from the high-order OTN frame (101), so as to meet the requirement of the OTN service on jitter.

16 Claims, 7 Drawing Sheets

U.S. PATENT DOCUMENTS

| | | |
|---|---|---|
| 6,486,990 B1 | 11/2002 | Roberts et al. |
| 6,792,005 B1 | 9/2004 | Antosik et al. |
| 6,941,078 B1 | 9/2005 | Onaka |
| 7,200,338 B2 | 4/2007 | Onaka |
| 7,440,700 B2 * | 10/2008 | Lee et al. ............ 398/135 |
| 2003/0043431 A1 | 3/2003 | Chand et al. |
| 2005/0018271 A1 | 1/2005 | Hu et al. |
| 2005/0286670 A1 | 12/2005 | Jungerman |
| 2006/0285854 A1 * | 12/2006 | Sun et al. ............ 398/155 |

FOREIGN PATENT DOCUMENTS

| | | |
|---|---|---|
| CN | 1262826 A | 8/2000 |
| CN | 1344077 A | 4/2002 |
| CN | 1522514 A | 8/2004 |
| CN | 1540911 A | 10/2004 |
| CN | 1622495 A | 6/2005 |
| CN | 1750400 A | 3/2006 |
| EP | 0 491 054 A1 | 6/1992 |

OTHER PUBLICATIONS

"Interfaces for the Optical Transport Network (OTN)," *International Telecommunication Union (ITU-T): Telecommunication Standardization Sector*, G.709/Y.1331: 1-96 (Mar. 2003).

\* cited by examiner

| MFAS bits 78 | Row | Col. 1 | 2 | ... | 15 | 16 | 17 | 18 | 19 | 20 | 21 | 22 | | 3821 | 3822 | 3823 | 3824 |
|---|---|---|---|---|---|---|---|---|---|---|---|---|---|---|---|---|---|
| 11 | 1 | | | | | | | | | | | | | | | | |
| | 2 | | | | | JOH TS4 | OPU1 TS1 | OPU1 TS2 | OPU1 TS3 | OPU1 TS4 | OPU1 TS1 | OPU1 TS2 | OPU5G Payload (4× 3808 bytes) | OPU1 TS4 | OPU1 TS1 | OPU1 TS2 | OPU1 TS3 |
| | 3 | | | | | | | | | | | OPU1 TS3 | | | | | OPU1 TS4 |
| | 4 | | | | PSI | | | | | | | OPU1 TS4 | | | | | |
| 00 | 1 | | | | | | | | | | | | | | | | |
| | 2 | | | | | JOH TS1 | OPU1 TS2 | OPU1 TS3 | OPU1 TS4 | OPU1 TS1 | OPU1 TS2 | OPU1 TS3 | OPU5G Payload (4× 3808 bytes) | OPU1 TS4 | OPU1 TS1 | OPU1 TS2 | OPU1 TS3 |
| | 3 | | | | | | | | | | | OPU1 TS4 | | | | | OPU1 TS4 |
| | 4 | | | | PSI | | | | | | | | | | | | |
| 01 | 1 | | | | | | | | | | | | | | | | |
| | 2 | | | | | JOH TS2 | OPU1 TS1 | OPU1 TS2 | OPU1 TS3 | OPU1 TS4 | OPU1 TS1 | OPU1 TS2 | OPU5G Payload (4× 3808 bytes) | OPU1 TS4 | OPU1 TS1 | OPU1 TS2 | OPU1 TS3 |
| | 3 | | | | | | | | | | | OPU1 TS3 | | | | | OPU1 TS4 |
| | 4 | | | | PSI | | | | | | | OPU1 TS4 | | | | | |
| 10 | 1 | | | | | | | | | | | | | | | | |
| | 2 | | | | | JOH TS3 | OPU1 TS1 | OPU1 TS2 | OPU1 TS3 | OPU1 TS4 | OPU1 TS2 | OPU1 TS3 | OPU5G Payload (4× 3808 bytes) | OPU1 TS4 | OPU1 TS1 | OPU1 TS2 | OPU1 TS3 |
| | 3 | | | | | | | | | | | OPU1 TS4 | | | | | OPU1 TS4 |
| | 4 | | | | PSI | | | | | | | | | | | | |
| 11 | 1 | | | | | | | | | | | | | | | | |
| | 2 | | | | | JOH TS4 | OPU1 TS1 | OPU1 TS2 | OPU1 TS3 | OPU1 TS4 | OPU1 TS2 | OPU1 TS3 | OPU5G Payload (4× 3808 bytes) | OPU1 TS4 | OPU1 TS1 | OPU1 TS2 | OPU1 TS3 |
| | 3 | | | | | | | | | | | OPU1 TS4 | | | | | OPU1 TS4 |
| | 4 | | | | PSI | | | | | | | | | | | | |

FIG. 3
Prior Art

METHOD AND APPARATUS FOR CLOCK RECOVERY

CROSS-REFERENCE TO RELATED APPLICATIONS

This application is a continuation of International Patent Application No. PCT/CN2007/070084, filed Jun. 5, 2007, which claims priority to Chinese Patent Application No. 200610083573.0, filed Jun. 7, 2006, both of which are hereby incorporated by reference in their entirety.

FIELD OF THE INVENTION

The present invention relates to the technical field of network communications, and, in particular, to a clock-recovery apparatus and a clock-recovery method.

BACKGROUND OF THE INVENTION

FIG. 1 shows a prior art of demapping and clock-recovery apparatus for Optical Channel Data Unit (ODU1) having a VC-4-17C frame structure.

In FIG. 1, a read-control module generates a gapped clock CLKb according to a mapping structure, as well as a clock and actual data, and writes the actual ODU1 data into a First-In First-Out Memory (FIFO) 1, according to the clock CLKb. A smooth-control module generates a smooth gapped clock CLKa according to the mapping structure and the actual data, in which case the clock CLKa includes uniformly-distributed gaps. The clock CLKa is used for controlling the reading speed of the FIFO 1, and data read from the FIFO 1 is stored in a FIFO 2. An ODU1-clock generating module generates a clock for the actual data ODU1, i.e. an ODU1 clock, by smoothing the clock CLKa with uniformly-distributed gaps through a phase-lock loop. The ODU1 clock controls the reading speed of the FIFO 2.

The above demapping and clock recovery apparatus makes it possible to recover an ODU1 clock with low jitter from VC-4-17C frames, and to ensure the high performance of the clock and the data.

In an Optical Transmit Network (OTN), OTN signals of low rate level may be asynchronously mapped and multiplexed into an OTN signal of high rate level; the OTN signals of low rate level represent low-order OTN frames, and the OTN signal of high rate level represents high-order OTN frames. There has been proposed a method of asynchronously mapping ODUj signals into an ODTUjk (ODTU: Optical channel Data Tributary Unit) signal, and a method of multiplexing ODTUjk signals into an OPUk (OPU: Optical Channel Payload Unit).

The method of asynchronously mapping ODUj signals into an ODTUjk signal will be illustrated briefly in conjunction with FIG. 2 and FIG. 3, in an example where 4 ODU0 signals are asynchronously mapped and multiplexed into an OTU5G (OTU: Optical Channel Transmit Unit).

For the ODU0 signals belonging to different clock domains, initially, justification bytes are generated through rate adaptation, to form ODTU0x frames as shown in FIG. 2. The ODTU0x frame shown in FIG. 2 has the following structure: 952 columns×16 (4×4) rows, and one column of Justification Overhead (JOH), where columns no. 473-476 of the ODTU0x frame are fixedly stuffed columns, and the ODTU0x includes a justified ODU0 frame, a positive justification location of 2 bytes and a negative justification location of 1 byte. In FIG. 2, NJO in the JOH is the negative justification byte, and PJO1 and PJO2 located in the same row as the NJO are the two positive justification bytes.

After the ODTU0x frames are formed, the four ODTU0x frames are multiplexed into an OPU5G signal through byte interleaving, and finally the OTU5G signal is formed to be transmitted and managed in the network.

The actual mapping structure for mapping four ODU0 signals into an OPU5G signal is shown in FIG. 3.

When OTN frames of low rate level, such as ODUj signals, are recovered from high rate OTN frames such as OTU5G and OTUk, for example, when an ODU0 signal is demapped and recovered from an ODTU0x signal, an asynchronous clock of the ODU0 signal is recovered from OTU5G. Because, different from the fixed stuffing and asynchronous rate justification control in units of bit for recovering ODU1 from VC-4-17C, stuffing and asynchronous justification of the high rate OTN frame is performed in units of byte, a great deal of mapping and combining jitters are certainly generated during the asynchronously mapping and demapping process. However, the OTN service has strict requirements on jitter. Therefore, when OTN frames of low rate level are recovered from high rate OTN frames by using the existing clock recovery method, it is difficult to guarantee the clock jitter performance of the actually output ODUx, and it is also difficult to satisfy the requirements of the OTN service on jitter.

SUMMARY OF THE INVENTION

Embodiments of the invention provide a clock recovery apparatus and a clock recovery method, enabling to recover a high-performance ODUx clock from high-order OTN frames, so that the requirements on jitter from the OTN service can be satisfied.

An embodiment of the invention provides a clock recovery apparatus, including: a high-order demultiplexing-demapping unit, for demapping and demultiplexing an high-order OTN frame into n low-order ODTUjk frames in a time-division manner; a plurality of memory units, for receiving and storing an ODUj frame; a low-order demapping unit, for demapping the n low-order ODTUjk frames, respectively, into n ODUj frames, writing the n ODUj frames into memory units 1 to n, and writing the ODUj frames in memory units 1 to n of the plurality of memory units into memory units n+1 to 2n of the plurality of memory units by using a generated clock signal with uniformly-distributed gaps; and an ODUj-frame-clock generating unit, for justifying the speed of reading from memory units n+1 to 2n according to the amount of data stored in memory units n+1 to 2n, generating an ODUj frame clock according to the speed of reading from memory units n+1 to 2n, and outputting the ODUj frame clock.

An embodiment of the invention further provides a clock recovery method, including: demapping and demultiplexing a high-order OTN frame into n low-order ODTUjk frames in a time-division manner; demapping the n low-order ODTUjk frames into n ODUj frames, respectively, writing the n ODUj frames into memory units 1 to n, and writing the ODUj frames in memory units 1 to n into memory units n+1 to 2n; and justifying the speed of reading from memory units n+1 to 2n according to the amount of data stored in memory units n+1 to 2n, and generating information on an ODUj frame clock according to the speed of reading.

It can be seen from the description of the above technical solutions that, the embodiments of the invention enable a high-performance clock signal to be recovered from a high-order OTN frame to fulfill the requirements of the OTN service on clock jitter by demapping and demultiplexing a high-order OTN frame into n low-order ODTUjk (Optical channel Data Tributary Unit) frames, demapping the n ODTUjk frames into n ODUj frames, respectively, and using a smooth clock signal with uniformly-distributed gaps to control the speed of reading from memory units 1 to n and the speed of writing into memory units n+1 to 2n, so as to filter the clock jitter generated during the asynchronous mapping and demapping processes.

BRIEF DESCRIPTION OF THE DRAWINGS

FIG. 3 is a schematic diagram of a mapping-multiplexing structure from 4 ODU0 signals to an OPU5G signal;

DETAILED DESCRIPTION OF THE EMBODIMENTS

The embodiments of the invention provide a technical solution for clock recovery, which is mainly applicable for the demultiplexing-demapping process from high-order OTN frames, i.e. OTN frames of high rate level, to low-order OTN frames, i.e. OTN frames of low rate level. The embodiments of the invention enable a great deal of jitters generated during the asynchronous mapping and demapping process to be filtered effectively, so that a high-performance clock can be recovered.

Figure 1:
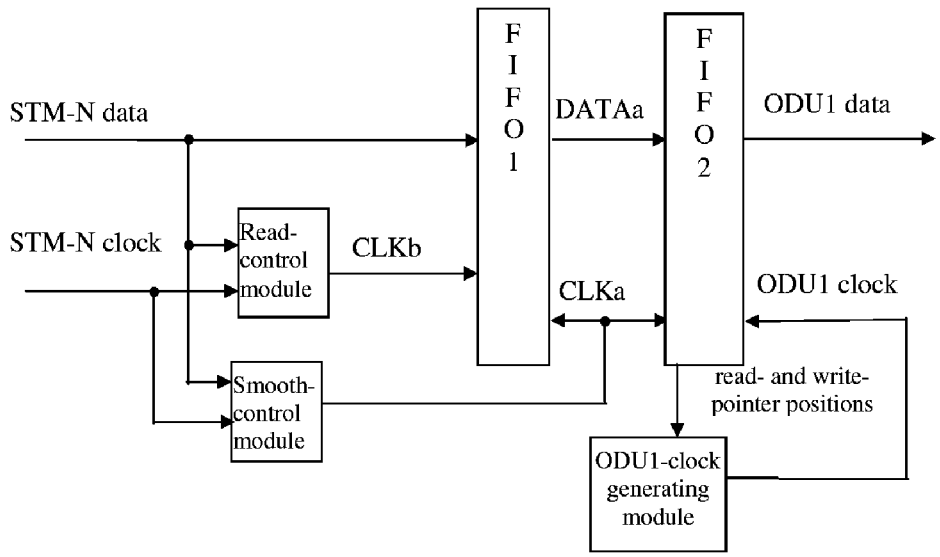
FIG. 1 is a schematic diagram of a prior-art clock recovery apparatus, according to VC-4-17C.
Figure 2:
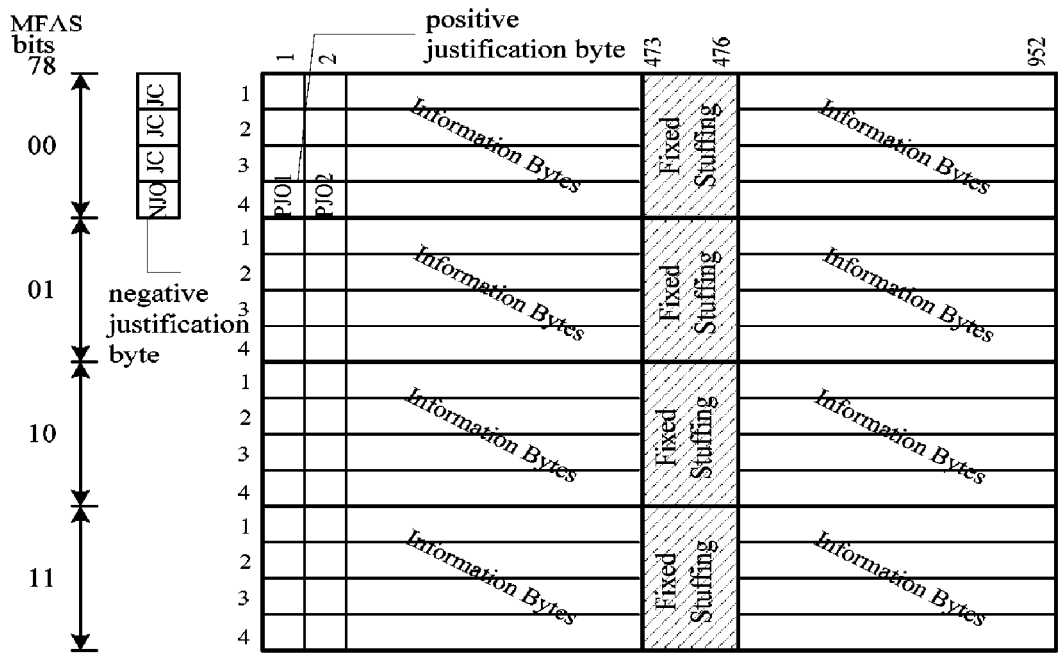
FIG. 2 illustrates a definition on the structure of ODTU0x frames.
Figure 4:
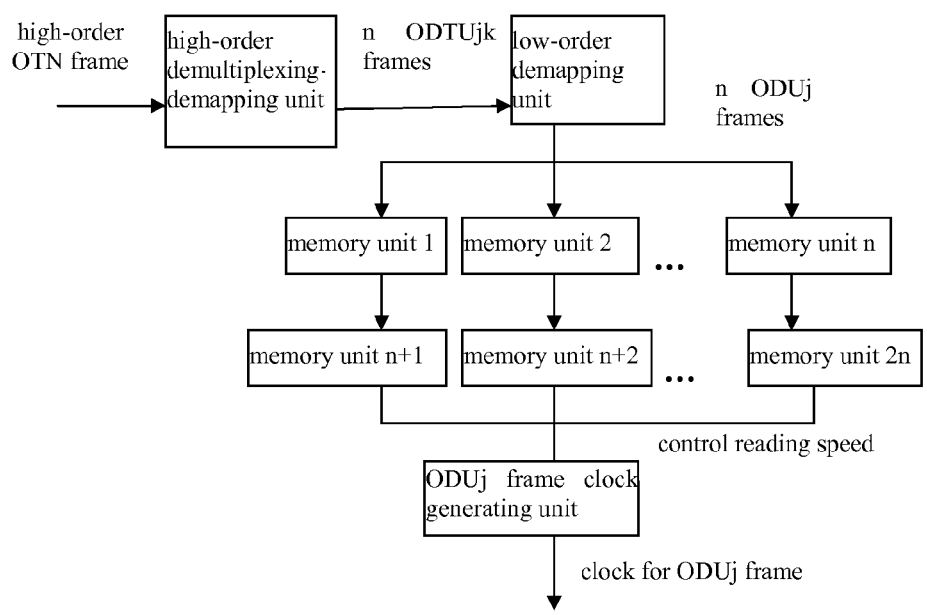
FIG. 4 is a schematic diagram of a clock recovery apparatus, according to an embodiment of the invention.

A clock recovery apparatus according to an embodiment of the invention is shown in FIG. 4.

In FIG. 4, the clock recovery apparatus includes a high-order demultiplexing-demapping unit, a plurality of memory units, a low-order demapping unit and an ODUj-frame-clock generating unit. Here, the memory units may be a FIFO memory. The number of the memory units may depend on the mapping-multiplexing structure from OTN frames of low rate level to OTN frames of high rate level; in other words, the number of the memory units may be twice of the number of ODUj frames of low rate level contained in an OTUk frame.

The high-order demultiplexing-demapping unit is mainly adapted to demultiplex and demap a high-order OTN frame into n ODTUjk frames.

The high-order demultiplexing-demapping unit includes a first write-control module, a first smooth-control module, and a memory module.

The first write-control module is mainly adapted to set a clock CLKA carrying an enabling signal according to the mapping structure of the high-order OTN frame, the payload of the high-order OTN frame and the clock of the high-order OTN frame, and write the payload of the high-order OTN frame into a memory module by using the clock CLKA. The first write-control module preferably generates the enabling signal of the clock CLKA at a non-overhead byte in the high-order OTN frame, without carrying the enabling signal of the clock CLKA at an overhead byte in the high-order OTN frame. Thus, the first write-control module is able to write only the payload of the high-order OTN frame into the memory module by using the enabling signal of the clock CLKA.

The first smooth-control module is mainly adapted to set a clock CLKB with uniformly-distributed gaps according to the multiplexing structure of the high-order OTN frame, the payload of the high-order OTN frame and the clock CLKA, and read n low-order ODTUjk frames from the memory module, according to the clock CLKB. The clock gaps uniformly distributed in the clock CLKB are mainly adapted to control the speed of reading from the memory module, so as to avoid the mismatch between the speed of writing into and the speed of reading from the memory module. For example, when a smooth period takes 15 clocks, the distribution of clock gaps during a smooth period may be 14 normal clocks plus 1 gap.

The n low-order ODTUjk frames read from the memory module are subjected to the demapping by the low-order demapping unit. The low-order demapping unit is mainly adapted to demap the n ODTUjk frames to n ODUj frames and write the n ODUj frames into memory units 1 to n. Each one of memory units 1 to n stores a corresponding ODUj frame. In other words, one ODUj frame is stored in one memory unit.

Because the ODTUjk frames may include fixed-stuffing bytes, positive justification bytes and negative justification bytes, the fixed-stuffing bytes, the positive justification bytes and the negative justification bytes in the ODTUjk frames are filtered in a low-order demapping process. In other words, the low-order mapping unit is configured to remove the fixed-stuffing bytes, the positive justification bytes and the negative justification bytes in the ODTUjk frames, and write the payload ODUj frames in the ODTUjk frames into memory units 1 to n.

The low-order demapping unit is further configured to generate a smoothly-gapped clock and write the ODUj frames in memory units 1 to n into memory units n+1 to 2n according to the clock. One of memory units n+1 to 2n stores a corresponding ODUj frame. In other words, one ODUj frame is stored in one memory unit.

The low-order demapping unit includes a second write-control module and a second smooth-control module.

To filter fixed-stuffing bytes, positive justification bytes and negative justification bytes in the ODTUjk frames, the second write-control module may set a gapped clock CLKC, according to the structure of the ODTUjk frames, the payloads of the ODTUjk frames, and the clock CLKB. Using the clock CLKC, the second write-control module filters the fixed-stuffing bytes, the positive justification bytes and the negative justification bytes in the n ODTUjk frames read from the memory module by the high-order demultiplexing-demapping unit, and stores the n ODUj frames into memory units 1 to n.

The second write-control module is configured to generate a clock signal carrying an enabling signal at non-fixed-stuffing bytes and non-positive justification bytes in the ODTUjk frames, and generate a clock without carrying enabling signals at fixed-stuffing bytes and positive justification bytes in the ODTUjk frames. Thus, the second write-control module is able to write the n ODUj frames into memory units 1 to n, according to the gapped clock CLKC carrying enabling signals at the fixed-stuffing bytes, the positive justification bytes, and the negative justification bytes.

The second write-control module may determine whether an ODTUjk frame has a positive justification byte or a negative justification byte, according to a JC byte in the ODTUjk frame. The second write-control module transmits the information on the positive justification bytes and the negative justification bytes contained in the ODTUjk frame to the second smooth-control module.

The second smooth-control module is mainly adapted to set a clock CLKD with uniformly-distributed gaps according to the information on the positive justification bytes and the negative justification bytes transmitted from the second write-control module and the clock CLKC, and write the n ODUj frames in memory units 1 to n into memory units n+1 to 2n. The clock gaps uniformly distributed in the clock CLKD are mainly adapted to control the speed of reading from memory units 1 to n, so as to avoid the mismatch between the speeds for writing into and reading from memory units 1 to n. The clock gaps uniformly distributed in the clock CLKD are further adapted to control the speed of writing into memory units n+1 to 2n. The clock gaps corresponding to fixed-stuffing bytes in the clock CLKD are distributed smoothly.

The second smooth-control module may determine ratio that a positive justification byte presents and that a negative justification byte presents every a predetermined number of frames, according to the information on the positive justification bytes and the negative justification bytes received by the second smooth-control module. Thus, the second smooth-control module may determine the number of clock gaps to be generated during a smooth clock period according to the ratio, and then set a clock CLKD with uniformly-distributed gaps according to the clock CLKC. If there is a positive justification byte and then a negative justification byte follows during a smooth clock period, no clock gap is generated for the positive justification byte and the negative justification byte during this smooth clock period.

The ODUj-frame-clock generating module is mainly adapted to justify the speed of reading from memory units n+1 to 2n according to the amount of data stored in memory units n+1 to 2n, and generate and output the clock signal for the ODUj frames.

The ODUj-frame-clock generating module includes a low-pass filter module, a reverse control module, a digital/analog (D/A) converting module, and a voltage-controlled oscillator (VCO) module.

The low-pass filter module reads read- and write-pointer positions for memory units n+1 to 2n, computes differences between the read- and write-pointer positions, performs low-pass filtering on the differences, and then sends the filtered result to the reverse control module. The reverse control module sends an intermediate value to the D/A converting module, and justifies the intermediate value sent to the D/A converting module, according to the filtered result received by the reverse control module. The D/A converting module controls the output of the VCO module, according to the intermediate value received by the D/A converting module. The clock signal output by the VCO module is the clock signal for the ODUj frames recovered from the high rate OTN frame.

The above high rate OTN frame may be an OTU5G frame or an OTUk frame. Moreover, index j for the above ODTUjk may take a value from 0 to 2, and index k may take a value from 1 to 3. In other words, the apparatus and method for clock recovery according to the embodiments of the invention make it possible to recover an ODU0 clock from the OTU5G frame, and recover an ODUj clock from the OTUk frame.

The clock recovery method according to an embodiment of the invention will now be illustrated.

In the embodiment of the invention, a high-order OTN frame is demapped and demultiplexed into n low-order ODTUjk frames in a time-division manner. During the demapping and demultiplexing process, a FIFO memory may be used. For example, a clock CLKA carrying an enabling signal is set according to the mapping structure of the high-order OTN frame, the payload of the high-order OTN frame and the clock of the high-order OTN frame, and the payload of the high-order OTN frame is written into the FIFO memory by using the clock CLKA. Then, a clock CLKB with uniformly-distributed gaps is set, according to the multiplexing structure of the high-order OTN frame, the payload of the high-order OTN frame, and the clock CLKA. The clock CLKB is adapted to control the speed of reading n ODTUjk frames from the FIFO memory. The above demapping and demultiplexing process may be realized by the first write-control module, the first smooth-control module, and the memory module described in the above apparatus; in other words, the memory module may be the above FIFO memory.

Upon demapping and demultiplexing the high-order OTN frame into n low-order ODTUjk frames in a time-division manner, the n low-order ODTUjk frames are demapped into n ODUj frames, respectively; for example, the n ODUj frames are written into memory units 1 to n, and the ODUj frames in memory units 1 to n are written into memory units n+1 to 2n by using a clock signal with uniformly-distributed gaps. The data frames stored in memory units n+1 to 2n are the demapped ODUj frames. Specifically, the above process of demapping n low-order ODTUjk frames into n ODUj frames may be as follows: a gapped clock CLKC carrying an enabling signal is set according to the structure of the ODTUjk frames, the payloads of the ODTUjk frames and the clock CLKB, and the ODUj frames in the n ODTUjk frames are stored into memory units 1 to n by using the clock CLKC. A clock CLKD with uniformly-distributed gaps is set according to the mapping structure of the ODTUjk frames, the payloads of the ODTUjk frames, and the clock CLKC, and the ODUj frames in memory units 1 to n are written into memory units n+1 to 2n according to the clock CLKD. To filter fixed-stuffing bytes, positive justification bytes and negative justification bytes in the ODTUjk frames, the specific process of setting the clock CLKD according to the embodiment of the invention is as follows: the JC byte in each ODTUjk frame is resolved every a predetermined number of frames, and information on the positive justification byte and the negative justification byte in the ODTUjk frame is determined according to the JC byte, and then a clock CLKD with uniformly-distributed gaps is set according to the mapping structure of the ODTUjk frame, the above information on the positive justification byte and the negative justification byte, the fixed-stuffing byte in the ODTUjk frame, and the clock CLKC.

The above process for demapping a low-order ODTUjk frame may be realized by the second write-control module and the second smooth-control module described in the above apparatus and memory unit 1 to n, i.e. 2n memory units.

Finally, the speed of reading from memory units n+1 to 2n needs to be justified according to the amount of data stored in memory units n+1 to 2n, and an ODUj frame clock is generated according to the reading speed.

The apparatus and clock recovery method according to the embodiments of the invention will now be illustrated in detail by taking the clock signal of ODU0 frames recovered from an OTU5G frame as an example.

In one embodiment of the invention, it is necessary to demap and demultiplex an OTU5G frame into 4 ODTU0x frames and then demap each ODTU0x frame into 4 ODU0 frames. Now, the method for demultiplexing-demapping an OTU5G frame into ODU0 frames using the clock recovery apparatus according to the embodiment of the invention will be illustrated in conjunction with FIG. 5.

Figure 8:
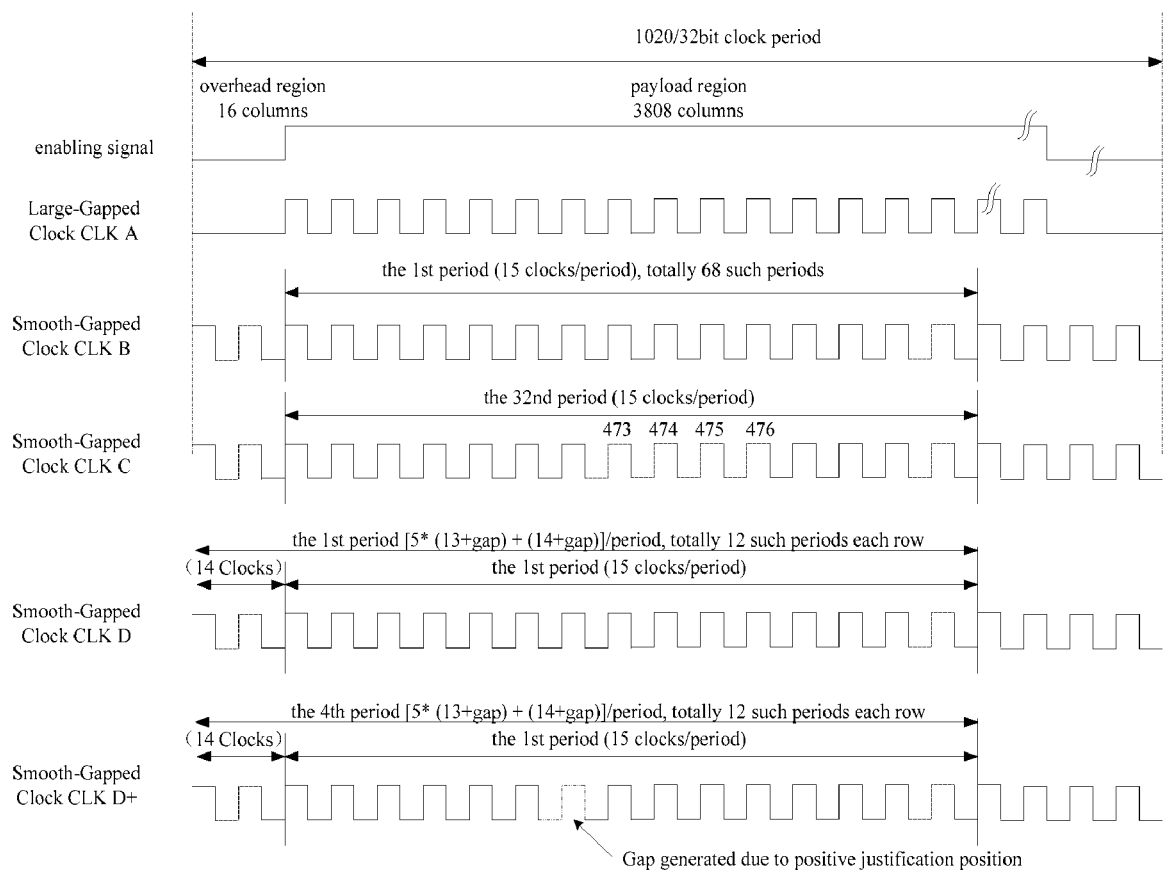
FIG. 8 is a schematic diagram of a progressive clock-smoothing process during a clock recovery process, according to an embodiment of the invention.

The first demapping process from an OTU5G frame to ODU0 frames comprises the following step: the first write-control module generates a gapped clock CLKA, according to the mapping structure of the OTU5G frame, the clock of the OTU5G frame, and the payload of the OTU5G frame. The clock CLKA is adapted to strip the overhead part in OTU5G; in other words, the clock CLKA generates a clock gap at the overhead in OTU5G, and generates a clock signal with an enabling signal at the payload of OTU5G. The first write-control module writes the payload in OTU5G into a FIFO0, according to the gapped clock CLKA. The timing of the clock CLKA is as shown in FIG. 8.

The demultiplexing process from an OTU5G frame to ODU0 frames comprises the following steps: the first smooth-control module generates a clock CLKB with uniformly-distributed gaps according to the multiplexed structure of the OTU5G frame, the payload of ODTU0x, and the clock CLKA. The gap positions in the clock CLKB are uniformly distributed, and the gap positions are fixed. The clock CLKB generated by the first smooth-control module is adapted to control the speed of reading from the FIFO0.

According to the actual multiplexed structure from ODTU0x to OPU5G, a gapped 83.67 MHz clock may be selected as the clock CLKA; in other words, the 83.67 MHz clock is a write clock for the FIFO0. At this point, the data bit width for input into the FIFO0 is 64 bit. After the bit width of the FIFO0 is converted, a jitter of 5.98 ns will be caused correspondingly each time a clock gap is generated. Apparently, at this point, the higher the clock rate is, the less the clock jitter generated by each gap will be.

The first smooth-control module may realize the uniform distribution of clock gaps through a preformed scheduling pattern. The method for computing a scheduling pattern is as follows: when the FIFO0 employs a bit width of 64 bits and the clock rate is 83.67 MHz, each row of OTU5G acts as a scheduling period, 1 scheduling period=4080 columns/4=1020 clock periods; the payload that needs to be read during 1 scheduling period is 3808 bytes; the clock pattern for the clock CLKB after the clock gaps are distributed uniformly is [14+gap]. Thus, 1020/15=68 smooth read periods of [14+gap] are needed to accomplish the transmit of each row of OTU5G. The timing of the clock CLKB generated by the first smooth-control module is as shown in FIG. 8.

The first smooth-control module demultiplexes the payload signal in the OTU5G frame into 4 ODTU0x frames via the FIFO0, and the 4 ODTU0x frames need to be demapped for the second time. After the 4 ODTU0x frames are demapped for the second time into ODU0 frames, the ODU0 frames are put into 4 corresponding FIFO1 to FIFO4, respectively.

The second write-control module generates a clock CLKC with an enabling signal according to the frame structure of ODTU0x frame, the payload of ODTU0x frame, and the clock CLKB. The clock CLKC should generate a clock gap without an enabling signal at the fixed-stuffing bit and positive justification byte of ODTU0x, and generate a clock signal with an enabling signal at the payload of ODTU0x frame. Thus, the second write-control module can write the ODU0 payload of ODTU0x into the FIFO1 to the FIFO4, according to clock CLKC. The time sequence of clock CLKC generated by the second write-control module is as shown in FIG. 8.

During the above demultiplexing process, the bit width conversion is performed at the same time; in other words, the data read from the FIFO0 are of 32 bit, and the FIFO0 converts the 64-bit data in the OTU5G frame into four 8-bit data. Because each row of OTU5G has 4080 columns, the gap clock pattern of the clock CLKB is 14 clock periods+1 gap, i.e. 14+gap. Thus, each row of OTU5G frame has 4080/15=272 such clock pattern cycles.

Additionally, for ODTU0x, ODTU12 or ODTU23 frame, a positive justification byte or a negative justification byte will be inserted every 4 frames; but for ODTU13 frame, a positive or a negative justification byte will be inserted every 16 frames. Thus, the first write-control module may transmit the information on the positive justification byte and the negative justification byte in each ODTU0x frame to the second smooth-control module via a JC byte, and the second smooth-control module may respectively compute ratio value of the positive and negative justification for 4 time slots every 4 frames, according to the information on the positive justification byte and the negative justification byte it receives during the demapping process, or respectively compute the ratio value of positive and negative justification for 16 time slots every 16 frames, so that the second smooth-control module can set the clock gap position, according to the ratio values of positive and negative justification. As a result, the clock gap may be smoothed as much as possible, and the influence of jitter caused by the positive justification byte and the negative justification byte in ODTU0x may be filtered.

During the above demultiplexing process, the bit width conversion may also be realized without using the FIFO0; instead, OTU5G may be directly demultiplexed into four ODTU0x signals. No matter whether the FIFO is employed to realize the bit width conversion, in the embodiments of the invention, a plurality of low rate frames are resolved from a high rate frame, according to the principle of time-division demultiplexing.

The second demapping process according to the embodiment of the invention is a process in which the fixed-stuffing bytes and the positive justification bytes and the negative justification bytes are removed from the ODTU0x frame; in other words, the main process in which the second write-control module demaps for the second time is as follows: the second write-control module sets the gap positions for the clock CLKC, according to the fixed-stuffing positions in the ODTU0x frame, the positive justification bytes and the negative justification bytes, and the clock CLKB, wherein the clock CLKC is a clock with an enabling signal. The clock CLKC is mainly adapted to control the speed of writing into the FIFO1 to the FIFO4. For each ODTU0x, the CLKC may be selected as a clock of 167.33 MHz with uniformly distributed gaps, according to the actual mapping structure from ODU0 to ODTU0x; thus, the bit width of data input into the FIFO1 to the FIFO4 is 8 bits.

The second smooth-control module generates a smooth clock CLKD with uniformly-distributed gaps according to the mapping structure of ODTU0x, the actual data and the clock CLKC, wherein the clock CLKD is adapted to control the speed of reading from the FIFO1 to the FIFO4. The timing of the clock CLKD is as shown in FIG. 8.

The second smooth-control module may realize the uniform distribution of clock gaps using a preformed scheduling pattern. The method for computing a scheduling pattern is as follows: when the FIFO1 to the FIFO4 employ a bit width of 8 bits and the clock rate is 167.33 MHz, each row of each ODTU0x acts as a scheduling period; thus, 1 scheduling period has 952 clock periods. The payload that needs to be read during 1 scheduling period is 948 bytes; the scheduling pattern after an equal allocation is [5(x+gap)+(y+gap)], wherein x and y are 13 and 14, respectively. In other words, to remove the fixed-stuffing bytes, it needs to add 4 gaps to each row on the basis of 14+gap; to allocate the 4 gap clocks in one row of ODTU0x, the gap clock pattern computed is [5*(x*CLK+gap)+(y*CLK+gap)], wherein x and y are 13 and 14, respectively.

Each row of ODTU0x has 12 such smooth periods, and one ODUT0x frame totally has 12×16=192 such smooth periods. When none of positive justification bytes and negative justification bytes exists in the ODUT0x frame, one ODTU0x totally has 192×6=1152 gaps; in other words, the number of gap clocks in one OTU5G frame is 1152.

When positive justification bytes and negative justification bytes exist in the ODUT0x frame, the second smooth-control module is further configured to set a clock signal in which the clock gaps are distributed uniformly, according to the numbers of positive justification bytes and the negative justification bytes.

The process of setting clock gaps according to the numbers of positive justification bytes and the negative justification bytes will now be discussed in 3 specific situations.

Situation 1: One Negative Justification Byte Exists in the ODUT0x Frame

Figure 5:
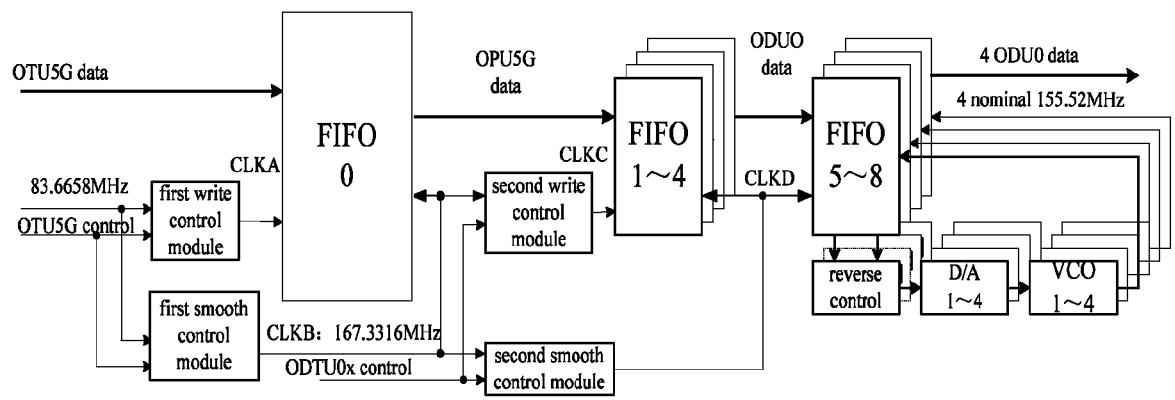
FIG. 5 is another schematic diagram of the clock recovery apparatus, according to an embodiment of the invention.
Figure 6:
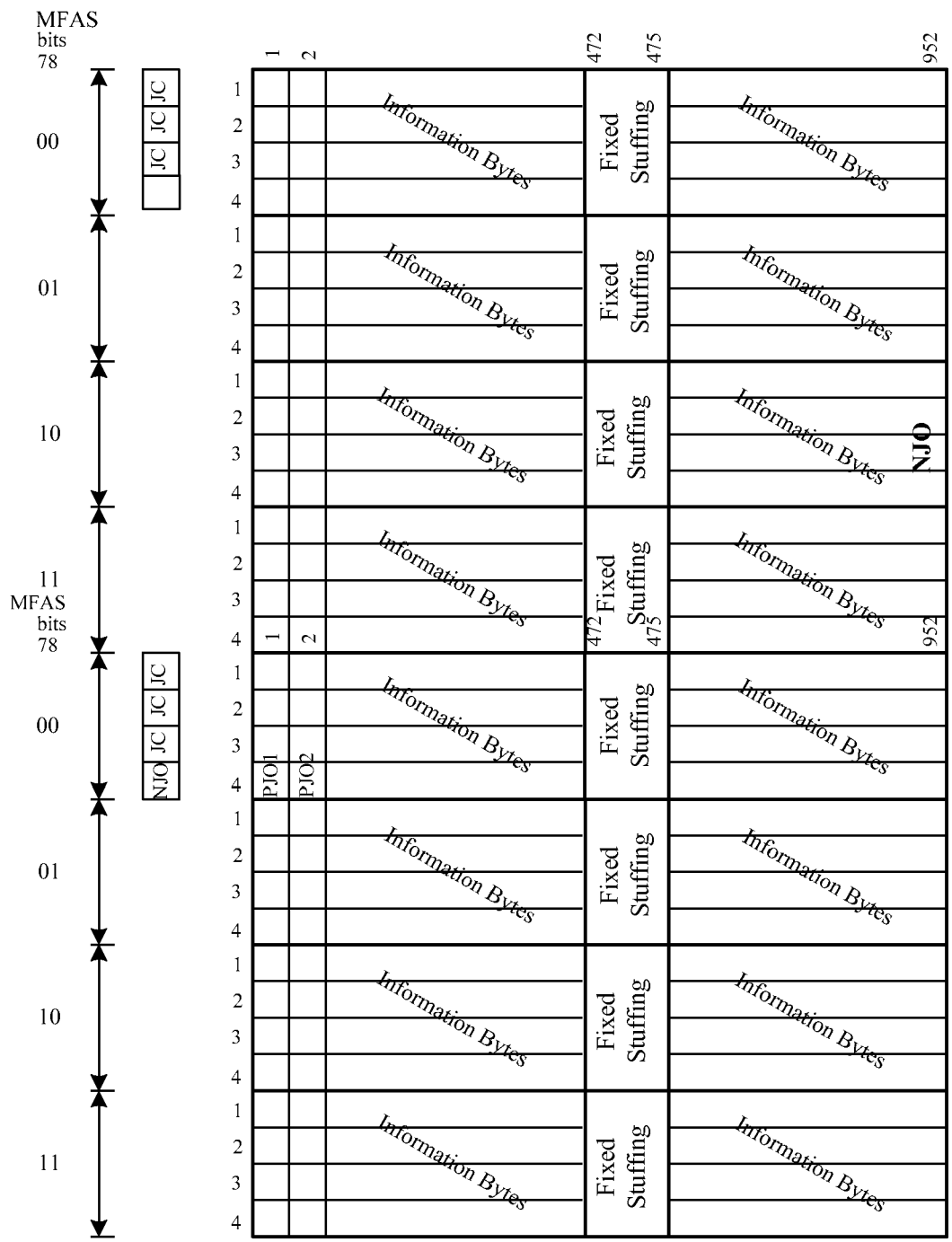
FIG. 6 is a schematic diagram of clock-enabling locations corresponding to negative justification bytes in an ODTU0x, according to an embodiment of the invention.

When one negative justification byte exists in the ODTU0x frame, the clock gap position cancelled due to the negative justification byte is as shown in FIG. 6. FIG. 6 shows a case where two ODTU0x frames are transmitted continuously. To make it easy to uniform the clock gaps, it can be seen from two ODTU0x frames that it is most ideal when the clock gap position cancelled due to the negative justification byte is a position in the last smooth period in the 11th row of the ODTU0x frame, i.e. position NJO marked at the payload position in FIG. 5. The specific clock gap cancellation position is the smooth period after 12×10+11=131 smooth periods; in other words, the first gap of the 132nd period is cancelled. Here, the period refers to [5(x+gap)+(y+gap)] clock periods, for example, as shown by NJO of FIG. 6. Thus, the negative justification clock enabling computed by the second smooth-control module is that no gap is generated in the 131×85+14=11149th clock period and the positions of the rest gaps in the clock CLKD keep unchanged.

Situation 2: One Positive Justification Byte Exists in ODUT0x Frame

When one positive justification byte exists in the ODTU0x frame, it is necessary to add a gap in the 132nd smooth period. Here, the period refers to [5(x+gap)+(y+gap)] clock periods; in other words, the 7th or 8th clock is cut out from (14+gap) of the 132nd smooth period and one clock gap is left; thus, the positive justification clock enabling computed is that a gap is generated at the 131×85+14×5+7=11212th clock period and the positions of the rest gaps in clock CLKD keep unchanged. At this point, the clock CLKD is as shown by CLKD+ in FIG. 8.

Situation 3: Two Positive Justification Bytes Exist in ODUT0x Frame

Figure 7:
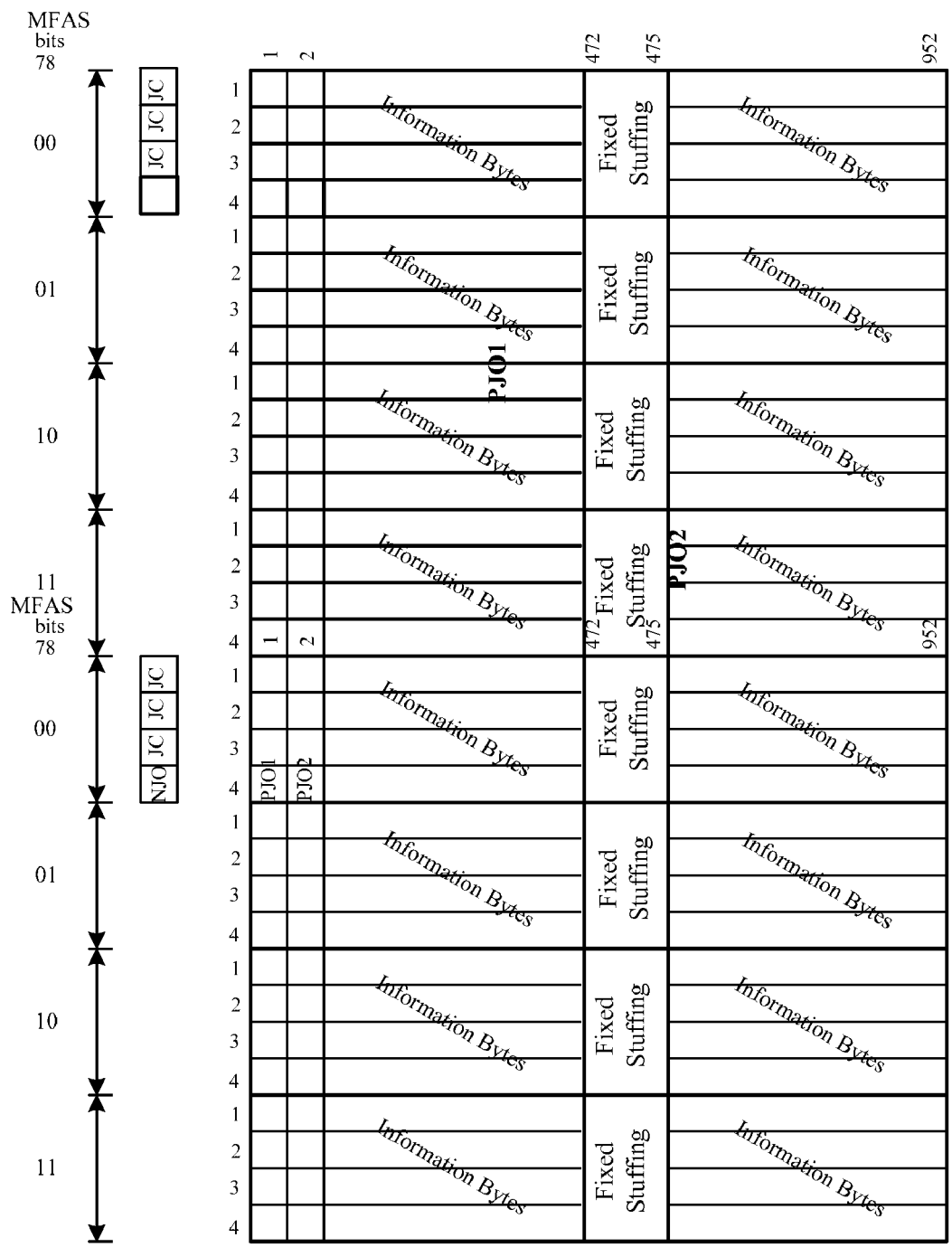
FIG. 7 is a schematic diagram of clock-gap location corresponding to 2 positive justification bytes in an ODTU0x, according to an embodiment of the invention.

When two positive justification bytes exist in the ODTU0x frame, the two clock gap positions generated in the ODTU0x frame due to the positive justification bytes are as shown in FIG. 7. FIG. 7 shows a case where two ODTU0x frames are transmitted continuously. It can be seen from the two ODTU0x frames that the clock gap positions generated by the positive justification bytes are PJO1 and PJO2 marked at the payload position in FIG. 7. At this point, the clock pattern needs to be rejustified. The position of the first positive justification byte is: 8×12×85+1020/3=8500, and the specific enabling position of the first positive justification byte is the 9th row. Thus, a gap may be added in (14+gap) of the 4th smooth period; in other words, the 7th or the 8th clock in the 4th smooth period is cut out and one gap is left. Thus, the clock period computed is that a gap is generated in the 8500−7=8493rd clock period. The position of the other positive justification byte is 13×12×85+1020×2/3=13940, and the specific enabling position of the second positive justification byte is the 14th row. Thus, a gap may be added in (14+gap) in the 8th smooth period; in other words, the 7th or the 8th clock is cut out and one gap is left. Thus, the clock period computed is that a gap is generated in the 13940−8=13932nd clock period and the positions of the rest gaps in the clock CLKD keep unchanged.

However, in the embodiments of the invention, other computation methods may also be used to determine the gap position in clock CLKD. For example, when 1 negative justification byte exists in the ODTU0x frame, the first gap of any period ([5(x+gap)+(y+gap)]) may be cancelled. In another example, when 1 or 2 positive justification bytes exist in the ODTU0x frame, the position of the gap corresponding to the positive justification byte may also locate in the 7th or the 8th clock period in any 1 or 2 (y+gap) periods.

The ODUj (Optical Channel Data Unit) clock generating unit mainly comprises a low-pass filter module, a reverse control module, a D/A converting module, and a VCO (Voltage-Controlled Oscillator) module. The low-pass filter module shown in FIG. 5 is integrated in FIFO5 to FIFO8. The low-pass filter module regularly reads read pointer positions and write pointer positions for the FIFO5 to the FIFO8, and the difference between the read pointer position and the write pointer position indicates the amount of data A remaining in the FIFO actually. The low-pass filter module performs digital low-pass filtering on the A it obtains each time, i.e. A1, A2, A3, . . . , and then sends the result B after the low-pass filtering to the reverse control module.

The reverse control module first sends an intermediate value to the D/A converting module so as to control the clock of ODU0 output by the VCO module; then, the reverse control module compares the B it obtains each time, i.e. B1, B2, B3, . . . , etc. If it finds that the value of B is becoming larger, it indicates that the clock frequency of ODU0 output by the VCO module is less than that of CLKD. At this point, the reverse control module increases the data output to the D/A converting module; on the contrary, it decreases the data output to the D/A converting module. The D/A converting module converts the value of digital quantity it receives into the corresponding a value of analog quantity. The value of analog quantity controls the output of the VCO module, and finally it makes the clock 155.52 MHz of ODU0 output by the VCO module equilibrated to that of CLKD.

It can be seen from the description of the above technical solutions that, in the embodiments of the invention, by demapping and demultiplexing a high-order OTN frame into n low-order ODTUjk (Optical channel Data Tributary Unit) frames and demapping the n ODTUjk frames into n ODUj frames, respectively, and controlling the speed of reading from memory units 1 to n and the speed of writing into memory units n+1 to 2n using a smooth clock signal with uniformly-distributed gaps at the same time, the clock jitter generated during the asynchronously mapping and demapping process may be filtered; and a great deal of jitters generated during the mapping and demapping process may be further filtered by smoothing the clock signal and controlling the speed of reading from the FIFO memory module using the smoothly processed clock signal during the process for demapping an ODU5G frame into n ODTUjk frames. Therefore, in the embodiments of the invention, a high-performance clock signal may be recovered from the high-order OTN frame, and the requirements of OTN service on clock jitter may be met.

Additional advantages and modifications will readily occur to those skilled in the art. Therefore, the invention in its broader aspects is not limited to the specific details and representative embodiments shown and described herein. Accordingly, various modifications and variations may be made without departing from the spirit or scope of the invention as defined by the appended claims and their equivalents.

What is claimed is:

1. A clock recovery apparatus, comprising:
   a high-order demultiplexing-demapping unit, for demapping and demultiplexing an high-order Optical Transmit Network, OTN, frame into n low-order Optical channel Data Tributary Unit ODTUjk frames in a time-division manner;
   a plurality of memory units, for receiving and storing Optical Channel Data Unit, ODUj, frames;
   a low-order demapping unit, for demapping the n low-order ODTUjk frames into n ODUj frames respectively, writing the n ODUj frames into memory units 1 to n of said plurality of memory units, and writing the ODUj frames in memory units 1 to n into memory units n+1 to 2n of said plurality of memory units by using a clock signal generated with uniformly-distributed gaps; and
   an ODUj frame clock generating unit, for justifying the speed of reading from the memory units n+1 to 2n according to the amount of data stored in the memory units n+1 to 2n, generating an ODUj frame clock according to the reading speed, and outputting the ODUj frame clock,
   wherein the high-order demultiplexing-demapping unit comprises:
   a memory module, for receiving and storing the payload of the high-order OTN frame;
   a first write-control module, for setting a clock CLKA carrying an enabling signal according to the mapping structure of the high-order OTN frame, the payload of the high-order OTN frame and the clock of the high-order OTN frame, and writing the payload of the high-order OTN frame into the memory module by using the clock CLKA; and
   a first smooth-control module, for setting a clock CLKB with uniformly-distributed gaps according to the multiplexing structure of the high-order OTN frame, the payload of the high-order OTN frame and the clock CLKA, wherein the clock CLKB is adapted to control the reading speed of reading the n low-order ODTUjk frames from the memory module.

2. The apparatus according to claim 1, wherein the low-order demapping unit comprises:
   a second write-control module, for setting a gapped clock CLKC carrying an enabling signal according to the structure of the ODTUjk frame, the payload of the ODTUjk frame and the clock CLKB, and storing the ODUj frame in the n low-order ODTUjk frames into memory units 1 to n by using the clock CLKC; and
   a second smooth-control module, for setting a clock CLKD with uniformly-distributed gaps according to the mapping structure of the ODTUjk frames, the payload of the ODTUjk frames and the clock CLKC, and writing the ODUj frames in memory units 1 to n into memory units n+1 to 2n according to the clock CLKD.

3. The apparatus according to claim 2, wherein the second write-control module resolves the JC byte in each ODTUjk frame every a predetermined number of frames, determines information on the positive justification byte and the negative justification byte in the ODTUjk frame according to the JC byte, and transmits the information to the second smooth-control module; and
   the second smooth-control module sets a clock CLKD with uniformly-distributed gaps according to the mapping structure of the ODTUjk frame, information on the positive justification byte and the negative justification byte, the fixed-stuffing byte in the ODTUjk frame and the clock CLKC.

4. The apparatus according to claim 1, wherein the ODUj frame clock generating unit comprises:
   a low-pass filter module, for reading read pointer positions and write pointer positions for the memory units n+1 to 2n, and performing low-pass filtering on the difference between the read pointer position and the write pointer position that is computed;
   a reverse control module, for sending an intermediate value, and justifying the intermediate value that is sent according to the filtering result of the low-pass filter module;
   a D/A converting module, for converting the intermediate value into an intermediate analog value; and
   a VCO (Voltage-Controlled Oscillator) module, which is controlled by the intermediate analog value, for generating a clock signal for the ODUj frame.

5. The apparatus according to claim 1, wherein the memory units are FIFO memories.

6. The apparatus according to claim 1, wherein the OTN frame comprises OTU5G frame and OTUk frame.

7. A clock recovery method, comprising:
   demapping and demultiplexing a high-order Optical Transmit Network, OTN, frame into n low-order Optical channel Data Tributary Unit , ODTUjk, frames in a time-division manner;
   demapping the n low-order ODTUjk frames into n Optical Channel Data Unit, ODUj, frames respectively, writing the n ODUj frames into memory units 1 to n, and writing the ODUj frame in memory units 1 to n into memory units n+1 to 2n by using a clock signal generated with uniformly-distributed gaps; and
   justifying the speed of reading from the memory units n+1 to 2n according to the amount of data stored in the memory units n+1 to 2n, and generating ODUj frame clock information according to the reading speed,
   wherein the step of demapping and demultiplexing a high-order OTN frame into n low-order ODTUjk frames in a time-division manner comprises:
   setting a clock CLKA carrying an enabling signal according to the mapping structure of the high-order OTN frame, the payload of the high-order OTN frame and the clock of the high-order OTN frame, and writing the payload of the high-order OTN frame into a memory module by using the clock CLKA; and
   setting a clock CLKB with uniformly-distributed gaps according to the multiplexing structure of the high-order OTN frame, the payload of the high-order OTN frame and the clock CLKA, and reading n ODTUjk frames from the memory module according to the clock CLKB.

8. The method according to claim 7, wherein the step of demapping the n low-order ODTUjk frames into n ODUj frames respectively, writing the n ODUj frames into memory units 1 to n and writing the ODUj frames in memory units 1 to n into memory units n+1 to 2n by using a clock signal with uniformly-distributed gaps comprises:
   setting a gapped clock CLKC carrying an enabling signal according to the structure of the ODTUjk frame, the payload of the ODTUjk frame and the clock CLKB, and storing the ODUj frame in the n ODTUjk frames into memory units 1 to n by using the clock CLKC; and setting a clock CLKD with uniformly-distributed gaps according to the mapping structure of the ODTUjk frame, the payload of the ODTUjk frame and the clock CLKC, and writing the ODUj frames in memory units 1 to n into memory units n+1 to 2n according to the clock CLKD.

9. The method according to claim 8, wherein the step of setting a clock CLKD with uniformly-distributed gaps according to the mapping structure of the ODTUjk frame, the payload of the ODTUjk frame and the clock CLKC comprises:

resolving the JC byte in each ODTUjk frame every a predetermined number of frames, and determining information on the positive justification byte and the negative justification byte in the ODTUjk frame according to the JC byte; and setting a clock CLKD with uniformly-distributed gaps according to the mapping structure of the ODTUjk frame, the information on the positive justification byte and the negative justification byte, the fixed-stuffing byte in the ODTUjk frame and the clock CLKC.

10. The method according to claim 8, wherein the the OTN frame is OTU5G frame, the ODUj frame is ODU0 frame.

11. The method according to claim 10, wherein the CLKA is a gapped 83.67 MHz clock.

12. The method according to claim 10, wherein the CLKC is a 167.33 MHz clock with uniformly-distributed gaps.

13. The method according to claim 7, wherein the step of justifying the speed of reading from the memory units n+1 to 2n according to the amount of data stored in the memory units n+1 to 2n, and generating ODUj frame clock information according to the reading speed comprises:

reading read pointer positions and write pointer positions for the memory units n+1 to 2n, and performing low-pass filtering on the difference between the read pointer position and the write pointer position that is computed;

sending an intermediate value, and justifying the intermediate value that is sent according to the filtering result;

converting the intermediate value into an intermediate analog value; and generating a clock signal for the ODUj frame according to the intermediate analog value.

14. The method according to claim 7, wherein the memory units are FIFO memories.

15. The method according to claim 7, wherein the OTN frame comprises OTU5G frame and OTUk frame.

16. The method according to claim 7, wherein during demapping and demultiplexing a high-order Optical Transmit Network, OTN, frame into n low-order ODTUjk frames in a time-division manner, the bit width of data of frames is converted from higher bit width to lower bit width.

* * * * *

UNITED STATES PATENT AND TRADEMARK OFFICE
CERTIFICATE OF CORRECTION

PATENT NO.         : 8,170,421 B2                                Page 1 of 1
APPLICATION NO.    : 12/328957
DATED              : May 1, 2012
INVENTOR(S)        : Jianchang Li It is certified that error appears in the above-identified patent and that said Letters Patent is hereby corrected as shown below:

In the Abstract, third line from the end, "recovery" should read -- recover --.

Signed and Sealed this
Seventh Day of August, 2012

David J. Kappos
*Director of the United States Patent and Trademark Office*